United States Patent [19]

Hujsak et al.

[11] Patent Number: 4,667,907
[45] Date of Patent: May 26, 1987

[54] SPACE BASED ORBIT TRANSFER VEHICLE

[75] Inventors: Edward J. Hujsak, La Jolla; Leroy E. Siden, San Diego, both of Calif.

[73] Assignee: General Dynamics Corporation/Convair Div., San Diego, Calif.

[21] Appl. No.: 672,656

[22] Filed: Nov. 19, 1984

[51] Int. Cl.$^4$ .................... B64G 1/22; B64G 1/62
[52] U.S. Cl. .................... 244/158 R; 244/158 A; 244/160; 244/172
[58] Field of Search ............ 244/158 R, 158 A, 160, 244/161, 162, 163, 172, 113, 12.2, 121, 135 R, 135 C; 220/3

[56] References Cited

U.S. PATENT DOCUMENTS

| | | | |
|---|---|---|---|
| 3,067,967 | 12/1962 | Barr | 244/23 C |
| 3,118,636 | 1/1964 | Kantrowitz et al. | 244/113 |
| 3,286,951 | 11/1966 | Kendall | 244/163 |
| 3,295,790 | 1/1967 | Webb | 244/160 |
| 3,758,051 | 9/1973 | Williams | 244/158 R |
| 4,318,491 | 3/1982 | Nelson et al. | 220/3 |
| 4,475,662 | 10/1984 | Mandel | 220/3 |
| 4,504,031 | 3/1985 | Andrews | 244/172 |

FOREIGN PATENT DOCUMENTS 0138120 4/1985 European Pat. Off. ........ 244/158 R

OTHER PUBLICATIONS

Stott et al, "The European Space Tug: A Reappraisal", 6-1980, BIS Space Transport. Symp.

Primary Examiner—Galen Barefoot
Attorney, Agent, or Firm—John R. Duncan; Frank D. Gilliam

[57] ABSTRACT

Disclosed is an orbital space transfer vehicle comprises essentially a composite hollow cylindrical body structure enclosing a spherical oxygen tank suspended and spaced from the inner wall of the cylindrical body structure, a hollow toroidal hydrogen tank suspended from and spaced from said cylindrical body structure, a main thrust rocket engine, and an aerobrake located at the aft end of the vehicle. This arrangement provides a vehicle with a very short length, lowers the required aerobrake size and maximizes vehicle controllability that may otherwise occur due to non-uniform distribution of the propellants during operation of the vehicle. Thus disclosed is a vehicle which can fully benefit from space basing, easily maintained while stationed in orbit, and transportable in a fully assembled state from earth to low earth orbit. Also disclosed is a space station with which the orbital transfer vehicle may cooperate while in space.

8 Claims, 4 Drawing Figures

SPACE BASED ORBIT TRANSFER VEHICLE

BACKGROUND OF THE INVENTION

This invention relates to space based orbit transfer vehicles.

There have been numerous orbit transfer vehicles studies and concepts, largely based or derivations of ground launched expendable vehicles. Recent efforts have attempted to solve the problem based on designs that are suited for space environment and that can be maintained in space. The result thus far calls for assembly of proposed vehicles in space.

This invention is the first known approach that enables construction of the entire vehicle on the ground, launch it into space as a complete assembly, including aerobrake, and still realize the benefits that accrue to space based design.

Thus, an object of this invention is to provide a space based orbit transfer vehicle that can fully benefit from the advantages that accrue to space basing, that is easily maintained while stationed in low earth orbit, that is easily protected from meteoroids and debris impact while stored in low earth orbit, and is transportable in a fully assembled state from earth to its low earth orbit operation station.

Another object of the invention is to provide such a vehicle not only with a basic chemical propulsion stage, but also a compact aerobrake by means of which the vehicle is recovered without the expenditures of propellant on its return flight from carrying payloads to outer orbits.

Other more specific objects and advantages of this invention, some of which are listed in the following SUMMARY, will become apparent to those skilled in the art after a study of the drawings and the detailed description set forth hereinafter.

SUMMARY OF THE INVENTION

The foregoing objects are achieved in this invention of an orbital space vehicle which comprises essentially a cylindrical graphite composite hollow body structure enclosing a spherical oxygen tank suspended and spaced from the inner walls of the cylindrical body structure, a toroidal hollow hydrogen tank suspended from and spaced from said cylindrical body structure, a main thrust rocket engine and an aerobrake located at the aft end of the vehicle.

As will be ascertained from the detailed description of more details of the vehicle hereinafter, the advantages and novel features of this invention are:

a very short length is achieved by the combination of propellant tanks in which a spherical oxygen tank is centered in a toroidal hydrogen tank;

the very short length lowers the required aerobrake area by a factor of four which is very significant in the vehicle performance in as much as the aerobrake is carried as dead weight on both outbound and inbound legs of a transfer mission;

a propellant tank arrangement in which the high mass propellant (oxygen) is centered over the line of thrust, while hydrogen, a low mass propellant, is carried in the surrounding toroidal tank. The effect of this is to maximize vehicle controllability and to minimize unbalance effects that may occur due to non-uniform distribution of the hydrogen in the torus, the oxygen tank and hydrogen tank are suspended from an inner graphite composite body structure to minimize structural weight and maximize the thermal separation between the two propellant containers, the toroidal hydrogen tank has a circumferential sump that is equipped with a propellant acquisition screen and which contains all components critical to the control and monitoring of the hydrogen propellant, hydrogen vaporization and gaseous storage sub-systems for the vehicle reactor control systems eliminate need for auxiliary propellants and pressurization gasses, high expansion ratio nozzle rocket engine for maximum performance, a small diameter lightweight aerobrake comprising graphite composite with a braking surface covered with a high temperature resistant low weight material, mechanically hinged doors for closure of the main engine opening before atmospheric entry, hinge and latch arrangement for securing the aerobrake in a manner that facilitates opening (like an automobile hood) in order to facilitate repair and replacement of the engine, and rail type installation for the avionic components which enables their ready replacement during maintenance operations.

DETAILED DESCRIPTION OF THE INVENTION

Figure 1:
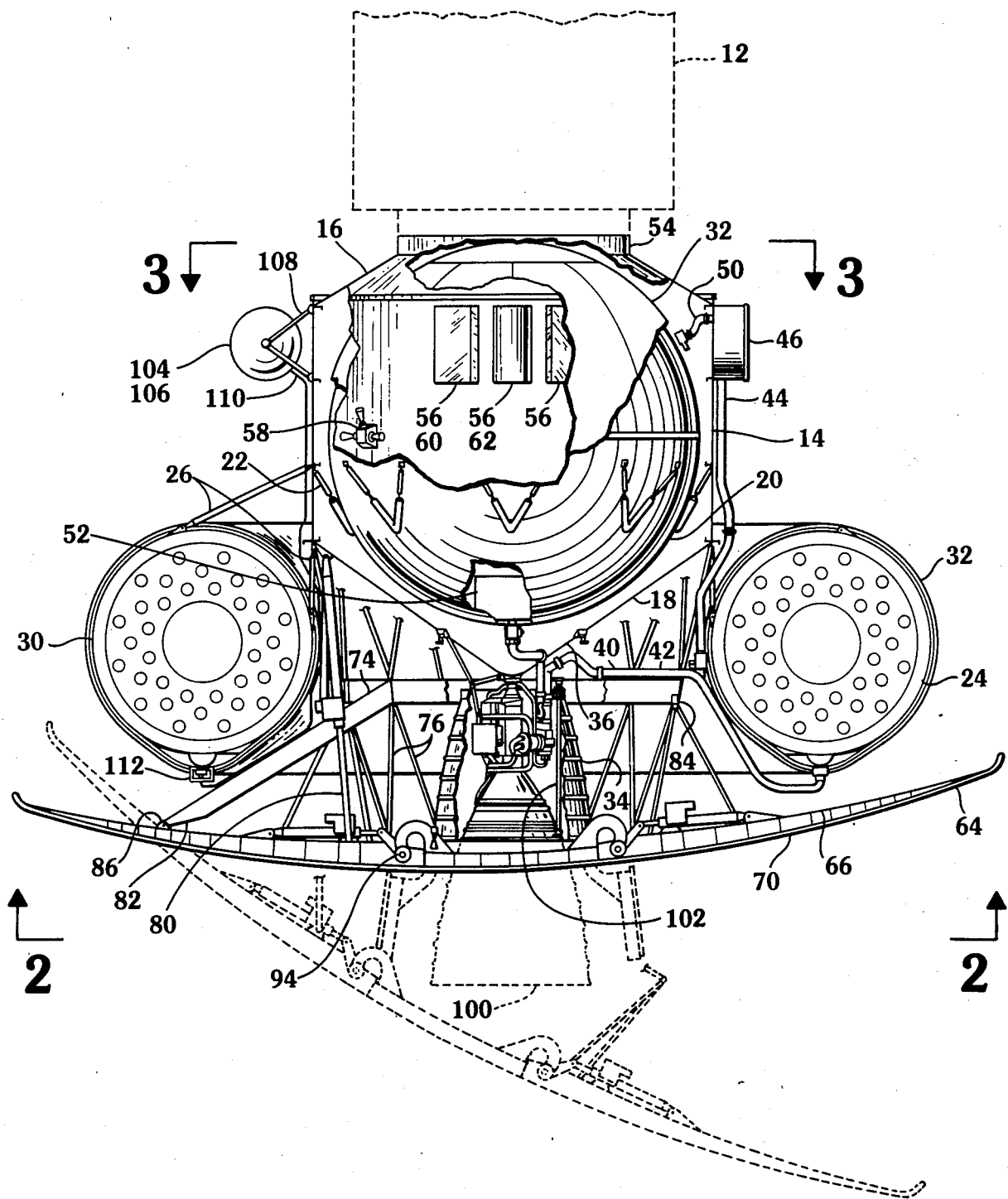
FIG. 1 is an elevational view, partly in section and partly in phantom, to show the working parts of the orbit transfer vehicle of this invention.
Figure 2:
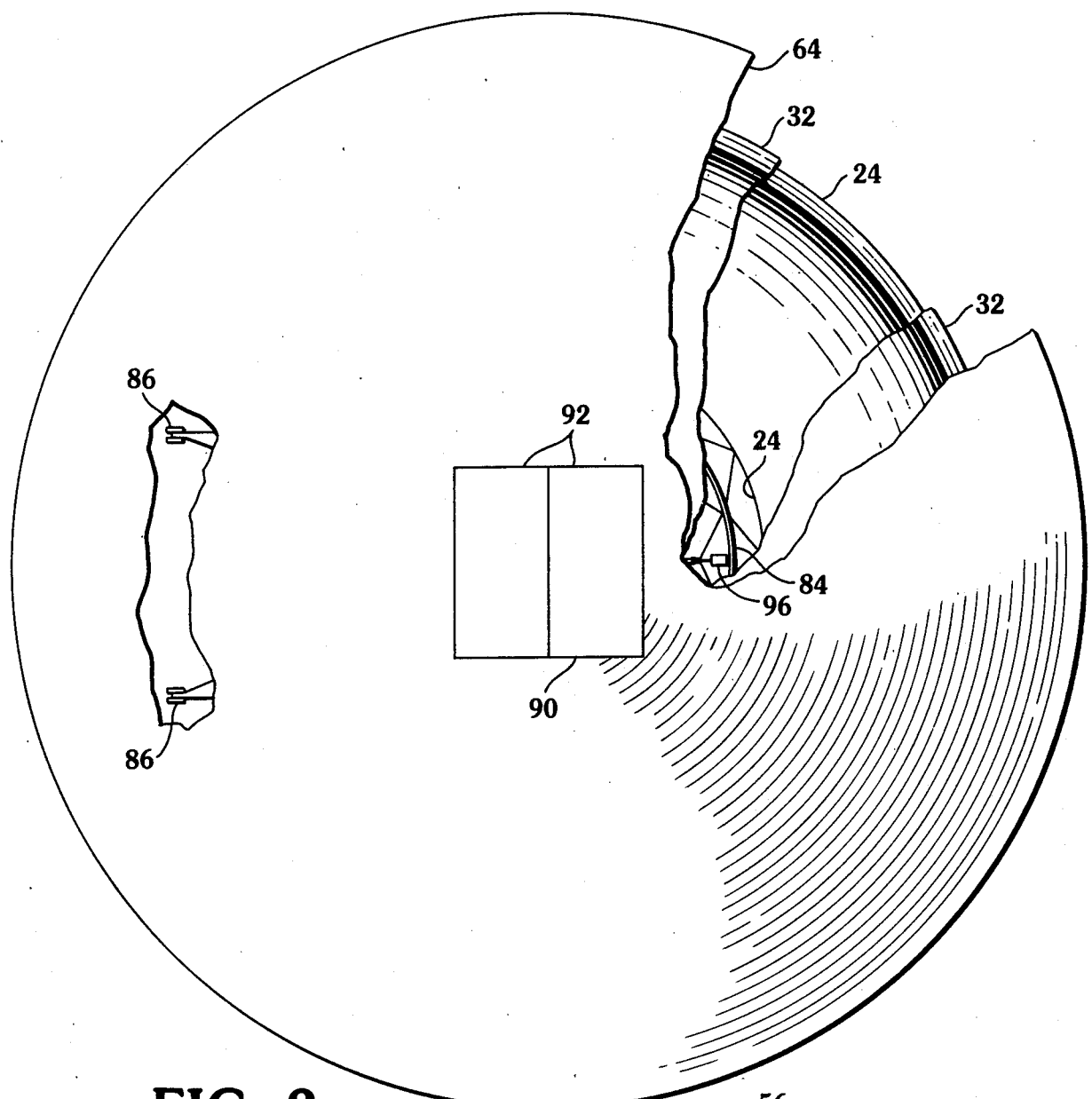
FIG. 2 is an end view looking forward from aft of the vehicle, with the aerobrake partially broken away to show some details of the vehicle.
Figure 3:
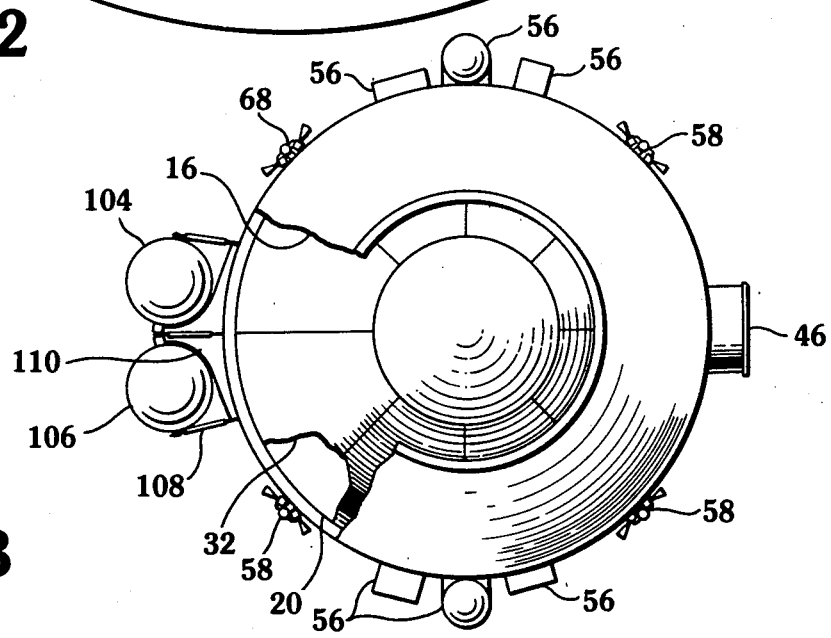
FIG. 3 is a front end view, taken along the line 33, of FIG. 1.

In the drawings, FIGS. 1, 2, and 3, should be considered together to understand the orbit transfer vehicle, denoted as 10, which handles a payload 12 connected at the forward end of the vehicle.

In these figures, vehicle 10 is shown as having a graphite epoxy composite cylindrical body structure 14 which is equipped at the forward end with conical payload adapter 16 and a conical thrust structure 18 at the aft end. This cylindrical body structure forms the support of the principle elements of the vehicle. The cylindrical structure is hollow and encloses a hollow spherical oxygen tank 20 which is suspended from the inner wall of the core by a network of thermal resistant struts 22.

A hollow toroidal shaped hydrogen tank 24 is suspended from the outer wall of the cylindrical body structure by means of a similar network of thermal resistant struts 26. This toroidal tank is provided with suitable baffles 30 distributed throughout the inner tank volume.

With the oxygen tank and hydrogen tank both suspended from the cylindrical body structure and spaced therefrom, structural weight is minimized and thermal separation is maximized. Also, the overall length of the vehicle is minimized.

Both the oxygen tank and the hydrogen tank are externally insulated by multi-layer reflective blankets 32. The hydrogen tank, being of a lower temperature, may require four times as many blanket layers (perhaps up to a hundred layers) more than the oxygen tank.

A main engine 34 is attached to a thrust cone 36 which in turn is attached to thrust structure 18. The thrust force for the main engine is carried out through the thrust structure to the cylindrical wall of the body structure 14 on which the major loads are carried. Oxygen, the high mass propellant, is thus centered over the main center of thr thrust while the lighter density material is in the torus. This minimizes the unbalancing effects that may occur due to non-uniform distribution of hydrogen in the torus. Fuel line 40 serves to connect the hydrogen tank to the main engine 34 and is branched at 42 to a fuel fill line 44 which connects to a fuel fill disconnect at berthing pad 46. The berthing pad also contains the oxidizer inlet line 50 to the oxygen tank 20. A section of the oxidizer inlet line 50 is located within the oxygen tank 20 and terminates near the propellant acquisition device 52.

The forward conical payload adapter 16 is attached to a docking fixture 54 shown as a short cylinder by means of which payloads such as 12 are attached and by means of which a returning vehicle automatically makes its initial joining or docking to a space station.

Avionic components 56 and thrusters 58 are mounted peripherally on the exterior wall of the forward end of the cylindrical body structure. Exposure of the avionic elements facilitates their thermal control by radiation. These avionic components are mounted in slit channels 60 with electrical connections made to a bus plate 62. Removal and replacement is thus a simple withdrawal and insertion process. Also attached to the cylindrical body structure is berthing pad 46 by means of which the vehicle is attached to a space station and through which fluid and electrical connections are made to service the vehicle.

Shown at the aft end of the vehicle is an aerobrake 64, a large dish shaped structure whose diameter is greater than the outside diameter of the toroidal oxygen tank 24 and comprises a graphite polymide base structure 66 faced with light weight silica tiles 70. The aerobrake is attached to the structural core by means of a graphite composite tubular truss network. This network comprises a ring 74 of lesser diameter than the toroidal tank and an inner and outer network of thermal resistant struts 76 ringing the main engine 34 and support strut 80 together with a pair of support trusses 82 attached to the ring and the aerobrake. A system of latches and hinges such as at 84 and 86 together with the support trusses allow the release and tilting of the aerobrake in the manner illustrated in phantom in FIG. 1 so that access to the engine and engine support components can be gained.

Centrally of the aerobrake dish is a rectangular opening 90 which is closed by two rectangular closures 92 in the form of doors hinged on the aerobrake at 94 and which are opened by means of mechanical actuators 96 when the vehicle is in the thrusting mode. The main engine fires through the opening 90 after its nozzle 100 has been extended by screw jack actuators, but for aerobrake reentry, the nozzle is retracted and the doors are closed. Suitable guides 102 guide and support the nozzle in both positions.

A feature of the vehicle is the use of hydrogen gas for reaction control. Two tanks 104 and 106 supported at the forward end of the cylindrical body structure by support struts 108 and yoke 110, are alternately charged with metered quantities of liquid hydrogen from the toroidal tank 24. The liquid is vaporized in the tanks and may be heated. From the tanks, the gas is directed through tubing to the solenoid operated thrusters 58 which provide the vehicle attitude control. The metered charges of liquid hydrogen are provided by a piston pump 112 which is installed in the liquid hydrogen tank sump.

Figure 4:
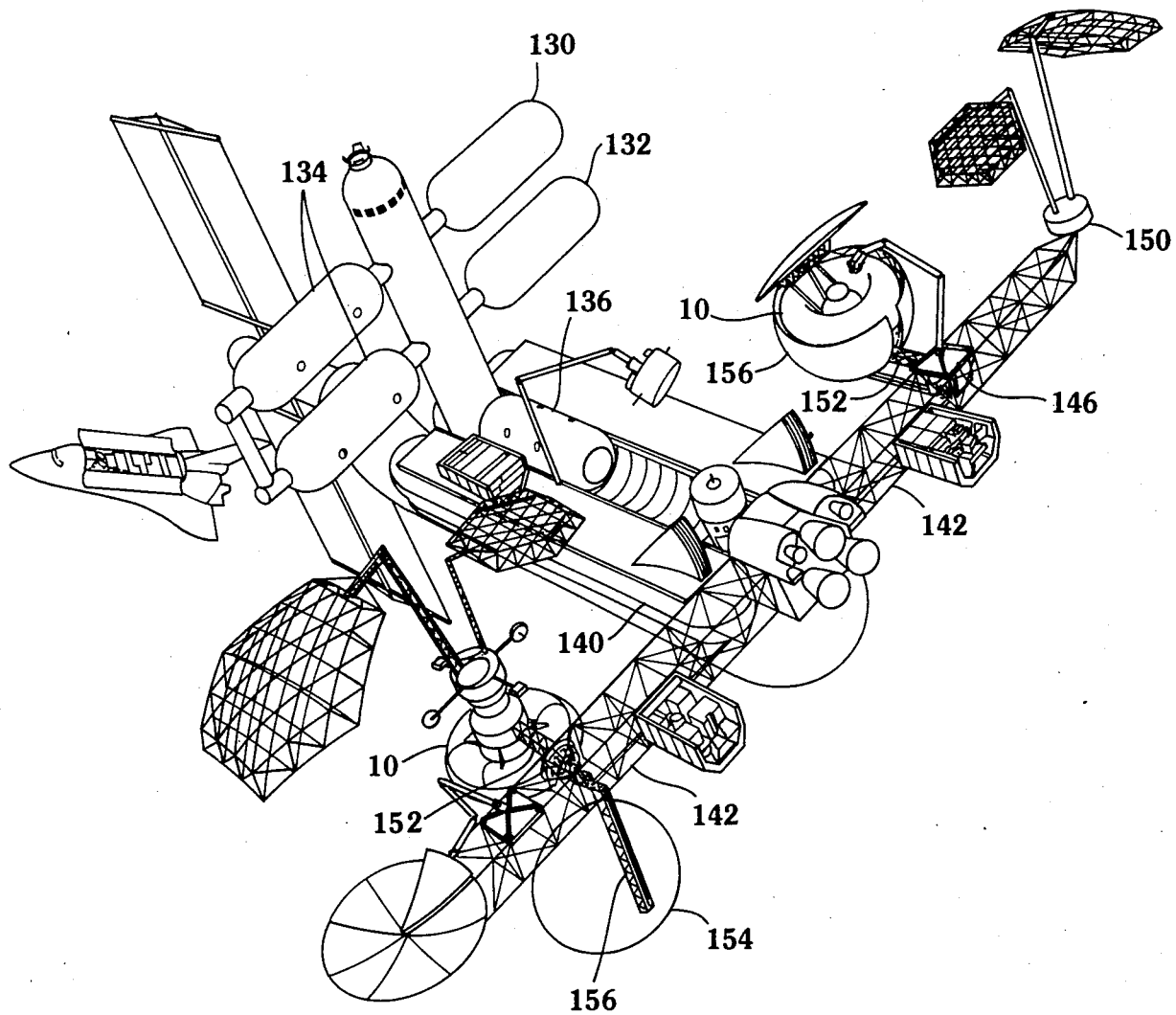
FIG. 4 illustrates a general arrangement for a space station from which the vehicle may operate.

The vehicle 10 is attached to a space station in the manner of FIG. 4. In this figure, there is shown a typical arrangement for a space station which includes a logistic module 130, a laboratory module 132, habitat module 134, a repair station (shelter) 136 and propellant storage tanks 140. Also connected to the station is a utility pier 142 which extends from the repair shelter and has two self propelled cranes 146 and construction turn tables 150 for spacecraft assembly. In the embodiment illustrated in FIG. 4, the utility piers have two pivoting struts 152 to rotate the vehicle in an inverted or upright position. Two geodesic domes 154 are mounted on struts 156 and serve the function of providing meteoroid protection for the vehicle when in storage. In this position, the aerobrake 46 serves as a cover shield against meteoroids. In the inverted position, the aerobrake 46 can be hinged open as illustrated in FIG. 4 so that access to the engine can be gained.

What is claimed is:

1. An orbital transfer vehicle comprising:
   a main engine,
   a hollow cylindrical body structure having an aft end in the form of a cone to which the main engine is connected and through which the main thrust of said engine is carried and a forward end in the form of a cone with a docking fixture attached,
   a spherical tank for containing oxygen located within and spaced from said cylindrical body structure,
   a toroidal tank for containing hydrogen encompassing and spaced from said cylinderical body structure and spaced from said tank for containing oxygen, and,
   an aerobrake attached to said cylindrical body structure at the aft end of said vehicle, an opening in said aerobrake for extension of said main engine when said vehicle is in a thrusting mode, and means for closing said opening when said vehicle is in reentry mode.

2. The orbital transfer vehicle as claimed in claim 1 further including thrusters on said vehicle for attitude control.

3. The orbital transfer vehicle as claimed in claim 2 including means for fueling said thrusters from the hydrogen tank.

4. The orbital transfer vehicle as claimed in claim 3 wherein said means for fueling said thrusters includes a pair of tanks and pumping means for supplying hydrogen to said tanks.

5. The orbital transfer vehicle as claimed in claim 4 including avionics on said cylindrical body structure, said avionics being located in rails on said cylindrical body structure which enables their ready replacement during maintenance operations.

6. The orbital transfer vehicle as claimed in claim 5 wherein said aerobrake is hingedly attached to said cylindrical body structure for access to the main engine for repair and maintenance of said engine.

7. The orbital transfer vehicle as defined in claim 1 wherein said aerobrake is located at the aft end of said vehicle, means for providing an opening through said aerobrake for the extension of the main engine there-through when said vehicle is in a thrusting mode, and means for closing said opening when said vehicle is in a reentry mode.

8. The orbital transfer vehicle as defined in claim 7 additionally comprising means for translating said engine longitudinally between vehicle thrust and reentry modes.

* * * * *